(12) United States Patent
Peters

(10) Patent No.: US 7,822,016 B2
(45) Date of Patent: Oct. 26, 2010

(54) IP ACD USING SIP FORMAT

(75) Inventor: Mike Peters, Downers Grove, IL (US)

(73) Assignee: Aspect Software, Inc., Lombard, IL (US)

( * ) Notice: Subject to any disclaimer, the term of this patent is extended or adjusted under 35 U.S.C. 154(b) by 1875 days.

(21) Appl. No.: 10/760,577

(22) Filed: Jan. 20, 2004

(65) Prior Publication Data

US 2005/0157731 A1    Jul. 21, 2005

(51) Int. Cl.
*H04L 12/66* (2006.01)
(52) U.S. Cl. .................. 370/352; 379/265.02; 370/400
(58) Field of Classification Search ............ None
See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 5,974,135 A | 10/1999 | Breneman et al. | |
| 5,987,115 A | 11/1999 | Petrunka et al. | |
| 5,989,772 A | 11/1999 | Tutt et al. | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,192,050 B1 | 2/2001 | Stovall | |
| 6,345,305 B1 | 2/2002 | Beck et al. | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,493,447 B1 * | 12/2002 | Goss et al. | 379/265.09 |
| 6,732,156 B2 | 5/2004 | Miloslavsky | |
| 6,785,380 B2 * | 8/2004 | Ribera | 379/265.09 |
| 6,826,194 B1 * | 11/2004 | Vered et al. | 370/449 |
| 6,850,612 B2 * | 2/2005 | Johnson et al. | 379/265.02 |
| 6,961,334 B1 * | 11/2005 | Kaczmarczyk | 370/354 |

(Continued)

FOREIGN PATENT DOCUMENTS

WO    WO 03/073731 A1    9/2003

(Continued)

*Primary Examiner*—Phirin Sam
(74) *Attorney, Agent, or Firm*—Husch Blackwell LLP Welsh Katz

(57) ABSTRACT

A method and apparatus are provided for distributing Internet calls by an automatic contact distributor. The method includes the steps of receiving a Session Initiation Protocol INVITE by the automatic contact distributor that identifies an Internet call to be established with a client, selecting an agent to handle the Internet call and exchanging call information between the client and the selected agent through a buffer server.

28 Claims, 1 Drawing Sheet

U.S. PATENT DOCUMENTS

| | | | |
|---|---|---|---|
| 7,103,644 B1* | 9/2006 | Zhang et al. | 709/219 |
| 7,142,648 B1* | 11/2006 | Miller | 379/88.23 |
| 7,185,094 B2* | 2/2007 | Marquette et al. | 709/225 |
| 7,372,957 B2* | 5/2008 | Strathmeyer et al. | 379/265.01 |
| 7,450,572 B2* | 11/2008 | Kucmerowski et al. | 370/352 |
| 7,480,723 B2* | 1/2009 | Grabelsky et al. | 709/228 |
| 2002/0073203 A1* | 6/2002 | Gilleland | 709/227 |
| 2002/0141404 A1* | 10/2002 | Wengrovitz | 370/389 |
| 2002/0150226 A1* | 10/2002 | Gallant et al. | 379/210.02 |
| 2002/0156900 A1* | 10/2002 | Marquette et al. | 709/227 |
| 2003/0014488 A1* | 1/2003 | Dalal et al. | 709/204 |
| 2003/0193961 A1* | 10/2003 | Moore et al. | 370/401 |
| 2004/0156380 A1* | 8/2004 | Silverman et al. | 370/428 |
| 2004/0170159 A1* | 9/2004 | Kim et al. | 370/352 |
| 2004/0196867 A1* | 10/2004 | Ejzak et al. | 370/468 |
| 2004/0203664 A1* | 10/2004 | Lei et al. | 455/414.1 |
| 2004/0213209 A1 | 10/2004 | O'Connor et al. | |
| 2004/0221061 A1* | 11/2004 | Chavez | 709/245 |
| 2005/0078657 A1 | 4/2005 | Huey | |
| 2005/0144247 A1* | 6/2005 | Christensen et al. | 709/207 |
| 2005/0188110 A1* | 8/2005 | Hollatz | 709/244 |

FOREIGN PATENT DOCUMENTS

WO    WO 2004/062191 A3    7/2004

* cited by examiner

IP ACD USING SIP FORMAT

FIELD OF THE INVENTION

The field of the invention relates to communication systems and more particularly to automatic call distributors.

BACKGROUND OF THE INVENTION

Automatic call distributors (ACDs) are known. Such systems are typically used by organizations to serve large numbers of callers. Typically, calls are directed to a common telephone number and distributed to agents based upon some criteria (e.g., agent idle time).

ACDs may process inbound or outbound calls. Typically, a controller monitors a workload of its agents. Where a workload of received calls fall below some threshold value, the controller may begin to initiate outbound calls.

In addition to placing and distributing calls, an ACD may also identify and display documents on agent terminals as an aid to processing the calls. In the case of incoming calls, the calls may be received along with dialed number identification service (DNIS) and/or automatic number identification (ANI) information. ANI may be used to identify a caller at the same instant as the call is delivered to the ACD. The controller of the ACD may use the ANI information to retrieve and display customer records on a terminal of the agent selected to handle the call at the same instant that the call is delivered to the agent.

In addition, textual information may be displayed on a terminal of the agent that guides the agent through a sales presentation. DNIS information may be used to identify an intended call target and to select an appropriate sales presentation for use by the agent based upon the intended call target.

While automatic call distributors work relatively well, they are not particularly well suited to handling Internet calls. Further, the standards that are used for processing switched circuit calls within the PSTN cannot be used within the Internet. Accordingly, a need exits for a better method of processing calls that is adaptable to both PSTN and Internet calls.

SUMMARY

A method and apparatus are provided for distributing Internet calls by an automatic contact distributor. The method includes the steps of receiving a Session Initiation Protocol INVITE by the automatic contact distributor that identifies an Internet call to be established with a client, selecting an agent to handle the Internet call and exchanging call information between the client and the selected agent through a buffer server.

DETAILED DESCRIPTION OF AN ILLUSTRATED EMBODIMENT

Figure 1:
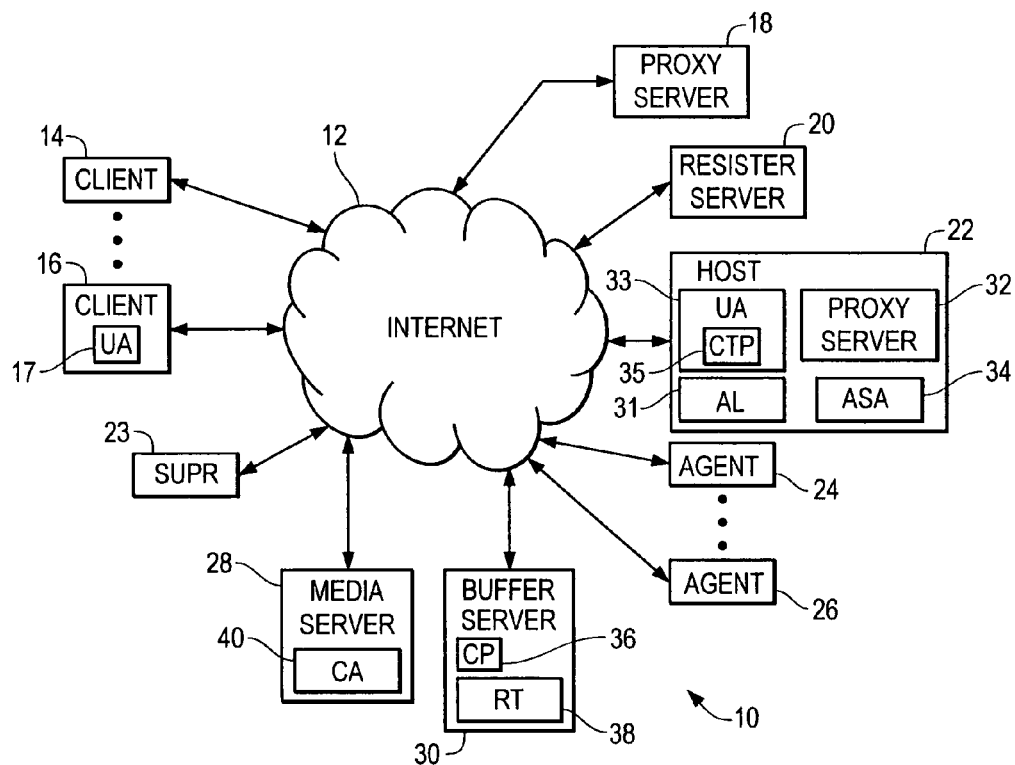
FIG. 1 is a block diagram of an automatic contact processor in accordance with an illustrated embodiment of the invention.

FIG. 1 depicts an automatic contact distributor system 10 using Session Initiation Protocol (SIP) shown in a context of use generally in accordance with an illustrated embodiment of the invention. As shown, the system 10 may receive or place calls through the Internet 12 or any other public or private network capable of handling SIP traffic.

The use of a SIP protocol allows two or more participants to establish a session wherein one or more media streams is exchanged with each participant. The media streams may be audio, video or any other combination of Internet-based communication mediums. The simultaneous setup and use of audio and video by the system 10 for one call between two or more parties is one example.

In general, the system 10 may be used by any of a number of different organizations (e.g., commercial, environmental, political, etc.) to advance the agenda of the organization. Access to the contact center 10 may be provided through the Internet under any of a number of different processes. In order to promulgate the agenda of the organization to its clients 14, 16 the organization may publish, by advertising or otherwise, one or more telephone numbers or universal resource locators (URLs) that identify communication paths to the organization.

The system 10 may include a host 22 that places and receives calls and that distributes those calls to the agents 24, 26 of the organization. One or more agent selection applications 34 may be provided within the host 22 for detecting calls and for selecting an agent for handling each call.

Calls may be placed to and received from the organization (i.e., from the system 10) using any of a number of different communication devices. For example, one client may place or receive calls through a SIP telephone 14 or personal computer 16 that is equipped with SIP communication software and that is connected directly to the Internet 12 or through an Internet Service Provider (ISP).

For example, to contact the organization, a client may enter a published telephone number of the organization into his SIP telephone 14. Entry of a telephone number into the SIP telephone 12 causes the telephone 12 to compose a number of messages that ultimately result in a call be directed to the organization.

In order to contact the organization, the telephone 12 must first locate a proxy server. To locate a proxy server, the telephone 14 may first perform a DNS SRV query to locate a proxy server 18 (e.g., at prox.com). Upon locating a proxy server, the telephone may compose a SIP INVITE 100 (FIG. 2) that incorporates the entered telephone number and send the packet message to the proxy server 18. As used herein, an INVITE is an Internet SIP message composed in accordance with the Internet Engineering Task Force (IETF) RFC #3261.

The proxy server 18 first identifies and then forwards the INVITE to a URL associated with the entered telephone number. In the case of the automatic contact server 10, the INVITE is forwarded to a buffer server 30. The buffer server 30 functions to conceal the URL of the agent 24, 26 from any serviced client 24, 26. The concealment of the URL of the agent 24, 26 from the client 14, 16 is performed to allow the organization to more effectively control agent utilization and to prevent clients 14, 16 from contacting agents directly without first contacting the organization (i.e., the host 22).

On the agent side, the buffer server 30 may use third party call control (as defined under SIP) to connect agent phones to the agent side of the buffer server 30 for the purpose of being joined with a caller. The event that triggers the agent side buffer server to initializes the third party call control software for a particular agent phone may be an agent signing in via a desktop application.

On the caller side, the buffer server 30 accepts SIP calls and forwards signaling and media into the call center on behalf of the caller. Once the caller is essentially "parked" at the buffer server 30, contact center applications can direct the buffer server to manipulate the signaling or media streams of the caller for the purpose of treatment and ultimately connection with an agent.

As a first step in forwarding the INVITE 100, the proxy server 18 may send a query to a registration server 20 to identify a URL of the organization. The registration server 20 serves as a registrar for PSTN telephone numbers registered by web entities. Registration with the registration server 20 in this case means registering a URL that corresponds to the registered PSTN telephone number.

Figure 2:
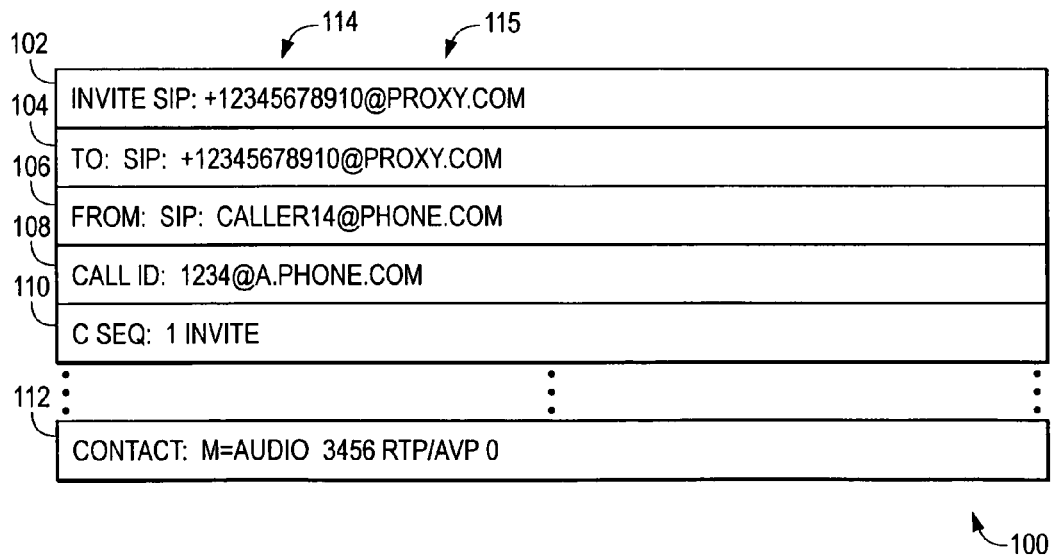
FIG. 2 is a simplified block diagram of an INVITE that may be used by the system of FIG. 1.

The SIP INVITE 100 may have the form shown in FIG. 2. A first line 102 of the INVITE 100 may include a URL of the target of the INVITE 100. In the case of a SIP telephone 12, the SIP telephone 12 does not initially have the URI of the call target identified by the telephone number. To solve this problem, the SIP telephone 12 may be programmed to initially direct all INVITEs to the proxy server 18 with the entered telephone number entered as a prefix 114 to a web address identifier (i.e., domain name 115) of the proxy 20.

The To header 104 of the INVITE 100 may identity an intended target of the INVITE 100. At this stage of the example, the content of the To header 104 may be the same as the first line 102.

The From header 106 may be a web identifier of a source of the call. In this example, the source of the call is the SIP telephone 14 (i.e., "caller14@phone.com").

The Call-ID header 108 may be a call identifier generated by the call source (in this case the SIP telephone 12) for purposes of message identification. The call identifier may be any unique number provided by the call source 14.

The Cseq header 110 may be a call sequence number. The call sequence number may be incremented for each message exchanged between source and target for purposes of detecting lost messages.

Another header 112 may propose a specific mode of communication to be used during a subsequent communication session. The mode may be proposed and negotiated using Session Description Protocol (SDP), although other mode descriptors could be used.

Upon receipt of the INVITE 100 from the telephone 14, the proxy server 18 may return a processing message "SIP/2.0 100 Trying" to the SIP telephone 14 and proceed to process the INVITE 100. As a first step, the proxy server 18 may forward the prefix 114 within the first line 102 to the registration server 20.

Within the registration server 20, the prefix 114 within the first line 102 may be used as a pointer to identify a location within a lookup table. Within the identified location may be a URL of the registering web entity. In this case, the registering web entity may be the organization and the URL registered by the SIP entity may be an agent selection application 34 within the host 22. In this example, the host 22 may have a domain name of "host.com" and may have registered the URL of "12345678910@host.com" for use with the registered telephone number.

The prefix "12345678910" within the URL may be used as an identifier to route the INVITE to the application 34 and as an identifier of a call type. In fact, the host 22 may register many different telephone numbers with the registration server 20 where each registration identifies the application 34 and each prefix identifies a different call type to the application 34. Alternatively, the prefixes may be used as a routing identifier to route each call type to a different agent selection application 34.

In order to redirect the INVITE 100 to the host 34, the proxy 24 may insert the registered domain name into the first line 102 of the INVITE 100. Once the first line 102 of the INVITE 100 has been changed to the URL associated with the host 34, the proxy server 18 may forward the INVITE 100 to the host 22.

Within the host 22, a user agent 33 may be provided that receives and identifies each modified INVITE 100. As each INVITE 100 is received, a call typing processor 35 within the user agent 33 compares the prefix 114 of the destination address 102 with a list of registered PSTN telephone numbers to identify those calls that will be directed to agents 24, 26 and to determine a call type of those calls. Once the INVITE 100 is determined as being intended for an agent, the INVITE 100 may be forwarded to the appropriate application 34. The application 34 may parse the INVITE 100 to retrieve an identifier of the dialed telephone number and the URL of the caller 12.

The dialed telephone number may be used to identify a subject matter of the call. The URL of the caller 12 may provide information about prior contacts with this caller 12.

Within the application 34, an agent 24, 26 may be selected to handle the call from an agent list 31. The agent list 31 may contain a current list (and universal resource indicators (URIs) or URLs) of agents 24, 26 who have signed into the host 22 and are currently available to receive calls. Also included within the agent list 31 may be a cross-referenced list of skills (e.g., call types) for which each agent is proficient.

The agent 24, 26 may be selected based upon idle time or upon skill in handling this particular type of call. It should be noted in this regard that using the original telephone number as a URL prefix allows the application 34 to identify a subject matter of the call. For instance, in the case where the organization is a department store with many different departments, a different telephone number may be registered within the registration server 20 for each department.

Upon selection of an agent 24, 26, the application 34 may redirect the call to the selected agent (e.g., 24) in such a way as to route messages between the agent and client through a buffer server 30. The application may do this in any of a number of ways (e.g., using a proxy server 32). As used herein, a buffer server is a processor (e.g., a router) that receives packets addressed to a first address and reroutes the packets to a second address based upon a directives from a process within the contact center 10 that is responsible for controlling the treatment of contacts.

The proxy server 32 may send a SIP instant message to the buffer server 30 that includes an identifier of the agent or a media server for announcements (e.g., an IVR, etc.), URL of the client (client14@phone.com) and the Call-ID of the INVITE. The instant message to the buffer server 30 may cause the buffer server 30 to perform routing for purposes of creating a second leg of the communication path between the buffer server 30 and client 14. That routing information may be placed into a persistent store (e.g., file in database).

Within the buffer server 30, a connection process 36 operating under the business rules of the organization will route the client to the appropriate SIP entity within the contact center using SIP methods.

The buffer server will respond to the initial invite of the caller in the manner prescribed for a User Agent by RFC 3261. Then a second call leg will be established by the buffer server sending an invite as directed above to the appropriate entity within the Contact Center. This will again be done in the manner prescribed for a user agent by RFC 3261. Inside the contact center, an agent may direct the buffer server to connect his/her SIP phone to the appropriate entity (media server) using third party call control. In this case the buffer server will send INVITES to both the agent's phone and the entity to which the agent will remain connected such as a media server. These INVITES will each be sent in the manner prescribed for a user agent by RFC 3261. The final connection from caller to agent will be made by joining the two dialogs within the media server or equivalent entity.

The client 14 may return an "ACK SIP: agent24@BUFFERSERVER.com" to acknowledge completion of setup of a communication channel. Upon receipt by the buffer server 30, the connection processor 36 may substitute "agent24@host.com" for the destination URL and "client14@BUFFERSERVER.com" for the source URL and may forward the acknowledge message to the agent 24.

As an alternative to redirecting the INVITE 100 directly to the agent 24, the application 34 or proxy server 32 may send the INVITE 100 to a buffer server 30 along with an identifier of the selected agent 24. The INVITE 100 and identifier of the agent 24 may be forwarded to the buffer server 30 using an SIP instant messaging format or by encapsulating the INVITE and identifier using an appropriate tunneling protocol (e.g., PPP).

To set up the call under the alternate embodiment, the buffer server 30 may first translate the INVITE 100 for use with the buffer server 30. In this regard, the buffer server 30 may substitute the URL of the agent "agent24@host.com" for "+12345678910@proxy.com" in the first line 102 and "client14@BUFFERSERVER.com" for "client14@phone.com" in the From header 106 of FIG. 2. The buffer server 30 may then forward the modified INVITE 100 to the selected agent 24 and proceed as described above.

Once the communication connection has been set up, the agent 24 and client 14 may converse in a manner appropriate for the communication channel. Upon completion of the call, the agent 24 may terminate the call by transmitting a "BYE SIP:caller14@BUFFERSERVER.com" message that will be converted and forwarded to the client 14 as discussed above. The caller may respond with a "SIP/2.0 200 OK". Alternatively, the caller 12 may terminate the call with the exchange of a corresponding set of messages.

In order to allow for supervision of agents 24, 26, the buffer server 30 may initially set up each call between agents and clients as a two-party conference call under the control of a conferencing application 40. The conferencing application 40 allows a supervisor 23 to perform traditional monitoring or barge-in functions.

The conferencing application 40 may include a SIP user agent to handle signaling, an RTP mixer to handle media streams and a conference application layer for the authentication, authorization and accounting (AAA) service. The supervisor 23 may use a SIP REFER request to activate a first sub-program within the conference application 40 to request mixing of signals from agent 24 and client 14 and forwarding of the mixed signals to the supervisor 23 for purposes of monitoring the conversation between the agent 24 and client 14. Alternatively, the supervisor 23 may use a second SIP REFER request to the same or different sub-program to achieve full participation in the conversation.

In addition to setting up calls between clients 14, 16, and agents 24, 25, the agent selection application 34 may also function to monitor call progress. In this regard, the application 34 may send a SIP REGISTRATION request to each agent 24, 26 requesting notification of status. When a SIP BYE is exchanged between agent 24, 26 and client 14, 16, notification is returned to the application 34 notifying the application of the termination of the call. In this case, the application 34 functions to modify the agent list 31 by adding the agent 24, 26 to the list of available agents 24, 26.

In another embodiment, a client having a personal computer 16 may see an ad published by the organization for a widget with an offer of more information at the web identifier "widget@host.com". Using a user agent (UA) 17 on his PC 16, the client may enter the web identifier into a GUI interface of the UA 17. The client may also enter a choice of communication medium (e.g., instant messaging, VoIP, etc.).

In response, the user agent 17 may compose and forward an INVITE addressed to the host 22. Within the host 22, the INVITE may be delivered to the agent selection application 34. The agent selection application 34 may parse the INVITE and recognize the prefix of the web identifier as being intended for an agent 24, 26 qualified to answer question related to widgets and may process the INVITE accordingly.

In this regard, the agent selection application 34 may search for and select a qualified agent (e.g., 26) and may assign the call to the agent 26. To assign the call to the selected agent 26, the application 34 may send the INVITE 100 and identifier of the agent 26 to the buffer server 30. The buffer server 30 may form another set of entries in the table 38 and redirect the INVITE 100 to the agent 26 by changing the URL within the first line 102 to an URL of the agent 26 (e.g., "agent26@host.com"), as discussed above.

Upon receiving the INVITE, the agent 26 may negotiate a communication protocol. For example, if the client 16 had requested instant messaging, then the negotiated protocol may be instant messaging. Alternatively, if the requested protocol had been VoIP, then the negotiated protocol may be VoIP.

In either case, upon completion of setup of the communication link, the agent 26 may send an acknowledge message to the client 16 and the client 16 and agent 26 may begin conversing. Upon completion of the conversation, the link may be terminated as discussed above.

A specific embodiment of method and apparatus for distributing calls has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of distributing Internet calls by an automatic contact distributor, such method comprising:
    receiving a Session Initiation Protocol INVITE by the automatic contact distributor sent over the Internet from a client;
    determining a call type from the Session Initiation Protocol INVITE;
    selecting an agent to handle the Internet call based upon the determined call type; and
    setting up an Internet call between the selected agent and the client through a buffer server based upon the Session Initiation Protocol INVITE and requesting notification from the agent upon termination of the Internet call.

2. The method of distributing Internet calls as in claim 1 wherein the step of setting up the call further comprises determining a URL of the selected agent.

3. The method of distributing Internet calls as in claim 1 further comprising determining a universal resource locator pair for use by the buffer server for routing packets between the selected agent and client.

4. The method of distributing Internet calls as in claim 1 further comprising routing a Session Initiation Protocol INVITE regarding the client to the selected agent.

5. The method of distributing Internet calls as in claim 1 further comprising the Session Initiation Protocol INVITE including a proposed mode of communication to be used from a subsequent communication session and using the Session Initiation Protocol INVITE to determine a communication protocol to be used for the Internet call.

6. The method of distributing Internet calls as in claim 1 further comprising setting up a communication link between the selected agent and the client.

7. The method of distributing Internet calls as in claim 1 further comprising conferencing a supervisor into the Internet call.

8. The method of distributing Internet calls as in claim 2 further comprising sending a SIP instant message to the buffer server that includes an identifier.

9. The method of distributing Internet calls as in claim 1 further comprising defining the communication link as a request for Voice over Internet Protocol.

10. The method of distributing Internet calls as in claim 1 further comprising defining the communication link as a request for Instant Messaging.

11. An automatic contact distributor for distributing Internet calls over the Internet, such apparatus comprising:
   means for receiving a Session Initiation Protocol INVITE within the automatic contact distributor, the INVITE received from a calling client over the Internet;
   means for determining a call type of the received Session Initiation Protocol INVITE;
   means for selecting an agent to handle the Internet call; and
   means for exchanging call information over the Internet between the client and the selected agent through a buffer server and for requesting notification from the selected agent upon termination of the Internet call.

12. The automatic contact distributor as in claim 11 further comprising means for determining a URL of the selected agent.

13. The automatic contact distributor as in claim 11 further comprising means for determining a universal resource locator pair for use by the buffer server for routing packets between selected agent and client.

14. The automatic contact distributor as in claim 11 further comprising means for routing a Session Initiation Protocol INVITE regarding the client to the selected agent.

15. The automatic contact distributor as in claim 11 further comprising means for using the Session Initiation Protocol INVITE to determine a communication protocol to be used for the Internet call.

16. The automatic contact distributor as in claim 11 further comprising means for setting up a communication link between the selected agent and the client.

17. The automatic contact distributor as in claim 11 further comprising means for conferencing a supervisor into the Internet call.

18. The automatic contact distributor as in claim 11 further comprising means for directing the Session Initiation Protocol INVITE to the selected agent using a URL of the agent and for permitting the agent to negotiate a communications protocol for the internet call.

19. The automatic contact distributor as in claim 11 further comprising means for defining the communication link as a request for Voice over Internet Protocol.

20. The automatic contact distributor as in claim 11 further comprising means for defining the communication link as a request for Instant Messaging.

21. An automatic contact distributor for distributing Internet calls, such apparatus comprising:
   a user agent adapted to receive and use a Session Initiation Protocol INVITE sent over the Internet from a client to determine a communication protocol to be used for the Internet call;
   a call typing processor adapted to identify a type of Internet call to be established with the client;
   an agent selection application adapted to select an agent to handle the Internet call based upon the call type;
   a proxy server adapted to transfer the Session Initiation Protocol INVITE to the selected agent; and
   a conference application adapted to conference a supervisor into the Internet call.

22. The automatic contact distributor as in claim 21 further comprising the call type identification based upon an identifier of call type within a prefix of a target URL of the Session Initiation Protocol INVITE, and an agent list for determining a URL of the selected agent.

23. The automatic contact distributor as in claim 21 further comprising a routing table adapted to determine a universal resource locator pair for use by a buffer server for routing packets between the selected agent and client.

24. The automatic contact distributor as in claim 23 wherein the proxy server sends a SIP instant message to the buffer server including an identifier.

25. The automatic contact distributor as in claim 21 further comprising a connection processor adapted to set up a communication link between the selected agent and the client.

26. The automatic contact distributor as in claim 21 where in the agent selection application is adapted to monitor call progress by sending SIP requests requesting notification of status.

27. The automatic contact distributor as in claim 21 further comprising defining the communication link as a request for Voice over Internet Protocol.

28. The automatic contact distributor as in claim 21 further comprising defining the communication link as a request for Instant Messaging.

* * * * *